US006221113B1

(12) United States Patent
Geiwiz

(10) Patent No.: US 6,221,113 B1
(45) Date of Patent: *Apr. 24, 2001

(54) LIQUID DYESTUFF COMPOSITIONS

(75) Inventor: Jürgen Geiwiz, Lörrach-Hauingen (DE)

(73) Assignee: Clariant Finance (BVI) Limited, Tortola (VG)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,149

(22) Filed: Jan. 13, 1998

(30) Foreign Application Priority Data

Jan. 14, 1997 (DE) .................................. 97 00 596

(51) Int. Cl.[7] .......................... C09B 67/00; C09B 44/00; C09B 67/02; C09B 49/00
(52) U.S. Cl. .......................... 8/586; 8/426; 8/524; 8/526; 8/527; 8/528; 8/585; 8/588; 8/607; 8/611; 8/613; 8/618; 8/633; 8/634; 8/644; 8/654; 8/655; 8/656; 8/657; 8/919; 8/594
(58) Field of Search .............................. 8/426, 527, 613, 8/644, 524, 526, 528, 654–657, 919, 586, 594, 611, 607, 585, 588, 618, 633, 634

(56) References Cited

U.S. PATENT DOCUMENTS

| | | | |
|---|---|---|---|
| 2,863,875 | 12/1958 | Bienert et al. | 260/314.5 |
| 3,070,418 | * 12/1962 | Bann et al. | 8/79 |
| 4,149,851 | 4/1979 | Frei et al. | 8/85 R |
| 4,189,328 | 2/1980 | Flores | 106/288 Q |
| 4,273,707 | 6/1981 | Pedrazzi | 260/187 |
| 4,842,646 | * 6/1989 | Gamblin | 8/527 |

FOREIGN PATENT DOCUMENTS

| | | |
|---|---|---|
| 482 814 | 12/1969 | (CH) . |
| 531 153 | 7/1931 | (DE) . |
| 19 23 123 | 11/1970 | (DE) . |
| 2104538 | 3/1983 | (GB) . |
| 2134131 | 8/1984 | (GB) . |
| 2228980 | 12/1990 | (GB) . |
| 2283980 | 5/1995 | (GB) . |

OTHER PUBLICATIONS

Colour Index, 3rd Edition, vol. 4, *The Society of Dyers & Colorists*, page 4390, 1971.*
Derwent AN 85–233758, abstract of JP 60 152408, Aug. 10, 1985.

* cited by examiner

Primary Examiner—Yogendra Gupta
Assistant Examiner—Brian Mruk
(74) Attorney, Agent, or Firm—Scott E. Hanf

(57) ABSTRACT

A liquid dyestuff composition comprising from 4 to 50 wt % of a basic or cationic water soluble dyestuff, an organic or inorganic acid and 0.1 to 15.0 wt % of a phenolic derivative, the dyestuff having a solubility in water in the presence or absence of a phenolic derivative of at least 1 g/liter at a temperature of 25° C. and the composition being made up to 100 wt % by water and optionally a water-miscible solvent and/or a dissolving auxiliary; a process of dyeing a substrate like paper with such composition; a powder or granulate form of such composition and the use of such a composition or powder or granulate thereof in a dyeing process.

11 Claims, No Drawings

LIQUID DYESTUFF COMPOSITIONS

The present invention relates to a stable, liquid dyestuff composition comprising a basic or cationic dyestuff in salt form, an inorganic or organic acid, a phenolic derivative, water and optionally a water-miscible solvent, to a process of dyeing a substrate with said composition, to a powder or granulate form of said composition and to the use of said composition or powder or granulate form thereof in a dyeing process.

The object of the present invention is to provide stable, liquid concentrated dyestuff compositions. Generally, in dyeing processes it is more suitable to use a liquid concentrated dyestuff composition of a particular dyestuff, rather than the powder form of the dyestuff, since use of the former obviates the need for a processing step in which the dyestuff is dissolved in a solvent. Use of liquid compositions is particularly valuable in continuous dyeing processes.

It is known to prepare liquid dyestuff compositions by dissolving a cationic or basic dyestuff in a suitable solvent such as an inorganic or organic acid. Such acids include for example hydrochloric, sulfuric, phosphoric, formic, acetic, glycolic, citric, gluconic, lactic and methanesulfonic acids. Furthermore, for example any one of the following components: formamide; dimethylformamide; benzylalcohol; urea; $\epsilon$ caprolactam; glycol or ethers thereof; dextrin; or addition products of boric acid with sorbit may be added to the dyestuff solution, optionally in the presence of an additive such as a stabilizer. Such preparations may be prepared for example, as described in U.S. Pat. No. 4,149,851.

The maximum dyestuff concentration achievable in stable, liquid dyestuff compositions is influenced on the one hand by the solubility of the dyestuff and on the other by the viscosity of the composition, the latter increasing with increasing dyestuff concentration. Generally, the dyestuff concentration can be increased by increasing the proportion of organic or inorganic acid or additional solvent means. However, the use of higher proportions of acids and/or additional solvent means, suffers, for example, from the disadvantages of the associated increase in Chemical Oxidation Demand (COD) and/or increased corrosiveness of the compositions. Accordingly from both ecological and economical aspects, it is desirable to produce concentrated liquid dyestuff compositions of water and dyestuff, with low viscosity but keeping the concentration of additional components as low as possible.

It has now surprisingly been found that solutions of dyestuffs suitable for use in the present invention, when containing a phenolic derivative, display a number of advantages in dyeing processes over the previously known aqueous compositions of the same dyestuffs which do not contain a phenolic derivative.

Surprisingly, the compositions of the present invention display inter alia lower viscosities compared to compositions which differ only in that the phenolic derivative is absent. Hereinafter, the latter compositions will be referred to as analogous non-phenol-containing compositions. Furthermore, on comparing analogous non-phenol-containing compositions with compositions of the present invention (both compositions having the same viscosity) one observes that the compositions of the present invention have a higher dyestuff concentration than the analogous non-phenol-containing compositions, in all cases where the solubility limit of the dyestuff has not been reached. In other words, for a composition having a given dyestuff concentration, the viscosity of the composition of the present invention is always lower than that of the analogous non-phenol-containing composition. Thus, the compositions of the present invention require a lower concentration of acid than the analogous non-phenol-containing composition, in order to achieve a particular viscosity. Moreover, the compositions according to the present invention have a high storage stability (over 12 months). In some cases the compositions are stable for 1–2 years. By the term storage stable is meant that the compositions do not separate or form precipitates, but remain a solution, when stored.

Compositions of dyestuffs containing phenolic derivatives are known, for example, from U.S. Pat. No. 4,842,646. This patent discloses compositions of water insoluble dyes with hydrocarboxylic acids, thereby obtaining a water soluble system that can be conveniently used to directly dye cellulosic materials. It is stated therein, that by "water insoluble" is meant ". . . a dye that by itself or in the presence of a mordant [because it has been pretreated with a mordant (e.g. tannic acid or gallic acid) or because the solution in which it is to be dissolved contains a mordant (e.g. tannic acid or gallic acid)] is insoluble or is soluble to an extent of no more than 1 mg/liter of water, but can be solubilized with the aid of a hydroxycarboxylic acid so that it is soluble in an aqueous solution to an extent of at least about 150 mg of dye per milliliter of solution."

The dyestuffs suitable for use in the present invention have a solubility in water either in the presence or absence of a phenolic derivative of greater than or equal to 1 g/liter of water, when the solubility is measured at 25° C. Most basic and cationic dyestuffs exhibit this degree of solubility. The basic and cationic dyestuffs suitable for use in the present invention are preferably direct dyestuffs and more preferably phthalocyanine direct dyestuffs.

In general, when comparing dyestuff compositions of similar viscosities and concentrations, the compositions of the present invention have a lower level of free acid (acid which is not used for salt formation) and/or additional water-miscible solvent (as hereinafter defined) compared to known compositions of the same dyestuffs suitable for use in dyeing processes. Thus by adding a phenolic derivative and at least one organic or inorganic acid to an aqueous solution of a basic and/or cationic water soluble dyestuff of the invention, and optionally a water-miscible solvent, one obtains a storage stable liquid composition which is particularly suitable for use in dyeing processes for the reasons discussed above.

The composition of the present invention also demonstrates very good exhaust, even after periods of storage. A comparison between the concentration of dyestuff remaining in the waste-water (water remaining after dyeing) resulting from e.g. a conventional paper dyeing process or from exhaust dyeing using a composition of the invention which has been stored for 12 months at 20° C. and the same composition which has not been stored, shows that the compositions which have been stored exhibit the same level of exhaust as those which have not been stored. Accordingly, storage does not adversely affect the dyeing strength of the compositions of the invention.

The present invention provides a liquid dyestuff composition comprising from 4 to 50 wt % of a basic or cationic water soluble dyestuff, from 1 to 20 wt % of an organic or inorganic acid and 0.1 to 15.0 wt % of a phenolic derivative, the dyestuff having a solubility in water in the presence or absence of a phenolic derivative of at least 1 g/liter at a temperature of 25° C. and the composition being made up to 100 wt % by water and optionally a water-miscible solvent and/or dissolving auxiliary.

The compositions of the present invention are suitable for use in a process of dyeing a hydroxy group- or nitrogencontaining organic substrate. Particularly suitable substrates are leather, textile materials comprising cellulose, especially cotton, bast fibers and paper. A preferred substrate is paper.

The compositions may be applied to the substrate to be dyed, using any conventional dyeing process, for example the textile dyeing processes such as exhaust or pad-dyeing or a paper dyeing process such as continuous dyeing in the stock.

Accordingly, the present invention further provides a process of dyeing a substrate comprising applying to said substrate a composition of the present invention by means of an exhaust- or pad-dyeing process or a continuous dyeing in the stock.

In a preferred embodiment of the invention, the dyestuff used in the composition is a direct dyestuff. Typical examples of such dyestuffs are those described in U.S. Pat. Nos. 4,273,707 and 5,084,068, the contents of which are incorporated herein by reference. The dyestuffs are disclosed in the form of liquid preparations comprising one or more of the dyestuffs, an inorganic salt, an organic acid, water and a dissolving assistant. There is no mention of the presence of a phenolic derivative. Accordingly, the compositions disclosed in U.S. Pat. Nos. 4,273,707 and 5,084,068 are analogous non-phenol-containing compositions.

Further suitable dyestuffs are any of the dyestuffs disclosed in GB 2,104,538, GB 2,134,131 or GB 2,228,980, the contents of each of which are incorporated herein by reference. Additionally, the aluminum phthalocyanine dyestuffs of GB 2,283,980 and the phthalocyanine dyestuffs of U.S. Pat. No. 2,863,875 can be used. None of these disclosures refers to a phenolic derivative, as in the present invention. Accordingly, the compositions disclosed in these references are all analogous non-phenol-containing compositions.

It is also contemplated to use mixtures of two or more of any of the above mentioned dyestuffs in the compositions of the present invention.

In a further embodiment of the present invention there is provided a powder formed from a composition of the invention. A powder may be formed according to any of the methods conventionally used for changing liquids into powder form e.g. spray drying. Formation of a powder is illustrated in Example 10 below.

In a yet further embodiment of the present invention there is provided a granulate-form (hereinafter referred to as a granulate-form) formed from a composition of the invention. The granulate may be formed according to any of the methods conventionally used for granulate formation, for example fluid bed spray drying. Formation of a granulate is illustrated in Example 11 below The organic or inorganic acid suitable for the purposes of the present invention is for example: hydrochloric acid, sulfuric acid, phosphoric acid, formic acid, acetic acid, glycolic acid, gluconic acid, methanesulfonic acid, citric acid, succinic acid, lactic acid, glutamic acid, adipic acid or mandelic acid. Any one of these acids may be used either alone or in an acid mixture, in the compositions and process of the present invention.

As indicated, this acid is present in an amount of 1 to 20 wt % (expressed as free acid), preferably of 1 to 15 wt %, most preferably 1 to 10 wt % of the total composition.

The phenolic derivative may be any one of the following compounds: resorcin; orcin; gallic acid; gallic acid ester e.g. gallic acid methyl ester, gallic acid ethyl ester, gallic acid propyl ester; gallic acid amide; gallic acid N-alkyl amide; gallic acid N,N-dialkyl amide; hydroquinone; pyrogallol; pyrogallolether; phloroglucin; 3,5-dihydroxybenzoic acid or 2,4-dihydroxybenzoic acid. Neither tannic acid nor dimer derivatives of gallic acid, like for example meta-D-gallic acid are suitable for use in the present invention. Preferred phenolic derivatives are gallic acid, gallic acid amide; gallic acid esters e.g. gallic acid methyl ester and gallic acid ethyl ester. The phenolic derivative suitable for use in the present invention have an upper molecular weight of 1000. It is preferred that the upper molecular weight is 300.

The phenolic derivative is present in an amount of 0.1 to 15.0 wt % of the solution, preferably in an amount of 0.1 to 8.0 wt %.

The water-miscible solvent may be one or more of the following compounds: dimethylformamide, benzylalcohol, glycol, glycolether, formamide and pyrrolidones such as N-alkyl pyrrolidone e.g. N-methyl-2-pyrrolidone.

In addition, one or more of the following auxiliaries may be added to the composition of the present invention: urea, sugars e.g. dextrine, maltose, lactose, s-caprolactam.

Both the water-miscible solvent and/or the auxiliary are present in an amount of 0.5 to 20 wt %, preferably of 0.5 to 10 wt %.

The order of addition of the components to each other to form the compositions of the present invention is not important.

The compositions of the present invention may be exemplified by the following examples in which parts are by weight, viscosity is measured in accordance with DIN 53214 using a Brookfield Viscometer DVII (small sample adapter) at 23° C. The stability of all the solutions described in the examples when stored at room temperature is at least 12 months. If no phenolic derivative is added, the compositions of examples 1 to 7 are in form of a gel.

EXAMPLE 1

490 parts of the dyestuff (ca. 45%) according to Example 1 of U.S. Pat. No. 5,084,068 with the formula of FIG. 1

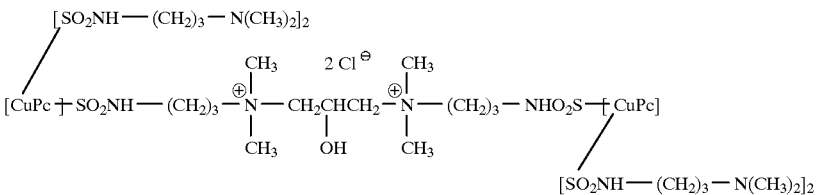

is dissolved in a mixture of 69 parts lactic acid, 81 parts acetic acid, 36 parts gallic acid monohydrate, 5 parts citric acid and 950 parts water. The resulting composition has a viscosity of 25 mPa.

EXAMPLE 2

The composition according to Example 1 is prepared except that 24.5 parts of gallic acid ethyl ester are used instead of the 36 parts gallic acid monohydrate and 960 g water are used. Viscosity: 10 mPa.

EXAMPLE 3

The composition is prepared according to Example 1, except that in place of 36 parts gallic acid monohydrate, 24.5 parts gallic acid methyl ester are used and 960 parts water are used instead of 950 parts water which are used in Example 1. Viscosity: 11 mPa.

EXAMPLE 4

Example 3 is repeated except that the propylester of gallic acid is used, instead of the methylester. Viscosity: 11 mPa.

EXAMPLE 5

282 parts of the dye of Example 1 of U.S. Pat. No. 5,084,068 are dissolved in 34 parts lactic acid, 73 parts acetic acid, 49 parts resorcin, 25 parts benzyl alcohol and 290 parts water. Viscosity: 23 mPa.

EXAMPLE 6

Example 5 is repeated except that 41 parts orcin-monohydrate are used instead of the resorcin and 300 parts water are used instead of 290 parts. Viscosity: 26 mPa.

EXAMPLE 7

282 parts of the dye of Example 1 of U.S. Pat. No. 5,084,068 are dissolved in a mixture of 167 parts gluonic acid (ca. 50%), 24 parts acetic acid, 16 parts gallic acid monohydrate, 2.5 parts citric acid and 300 parts water. Viscosity: 23 mPa.

EXAMPLE 8

600 parts of the dye (ca. 48%) of Example 1 of U.S. Pat. No. 4,273,707 with the formula of FIG. 2

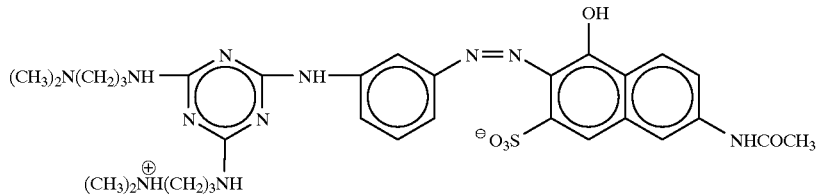

are dissolved in a mixture of 75 parts acetic acid, 135 parts lactic acid, 18 parts gallic acid monohydrate, 2.5 parts citric acid and 2700 parts water. Viscosity: 11 mPa.

EXAMPLE 9

The composition of Example 8 is prepared except that 9 parts gallic acid ethylester are used instead of the gallic acid monohydrate. Viscosity: 10 mPa.

EXAMPLE 10

1130 parts of the dye (ca. 45%) of Example 1 of U.S. Pat. No. 5,084,068 are dissolved in a mixture of 126 parts lactic acid (ca. 80%), 70 parts gallic acid and 2900 parts water. The composition is dried using a Mini Spray Dryer (Type 190 of Büchi, Flawil/Schweiz). 680 g of powder are obtained.

EXAMPLE 11

A slurry of 8.4 parts urea, 102 parts dextrin, 2 parts gallic acid ethyl ester and 80 parts the dyestuff of Example 6 (ca. 33%) of U.S. Pat. No. 2,863,875, with the formula

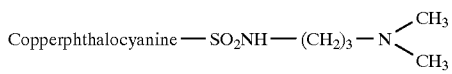

(said dyestuff being prepared using 1-amino-3-dimethyl-amino-propane rather than 1-amino-2-dimethyl-amino-propane) are neutralized with conc. hydrochloric acid and thereafter fluid bed-spray dried. The resulting granulate is treated with 3 parts of oil to obtain 142 parts dust-free granulate.

APPLICATION EXAMPLE A

Water is added to a dry pulp in Hollander consisting of 60% (by weight) of mechanical wood pulp and 40% (by weight) of unbleached sulfite cellulose, and the slurry is beaten in order to obtain a dry content slightly exceeding 2.5% and having a beating degree of 40° SR (degrees Schopper-Riegler). The slurry is then exactly adjusted to a high density dry content of 2.5% by adding water. 5 parts of the composition of the dyestuff according to Example 1 are added to 200 parts of the above resulting slurry. The mixture is stirred for about 5 minutes and, after the addition of 2% (by weight) resin size and then 4% (by weight) alum (based on the dry weight) is further stirred for a few minutes until homogeneous. The resulting pulp is diluted with about 500 parts water to a volume of 700 parts and then used for the production of paper sheets by suction on a sheet former. The resulting paper sheets are dyed a brilliant turquoise.

APPLICATION EXAMPLE B 0.2 parts of the dyestuff powder according to Example 10 or of the granulate according to Example 11, were dissolved in 100 parts hot water and cooled to room temperature. The solution is added to 100 parts chemically bleached sulphite cellulose which have been groung with 2000 parts water in a Hollander. After 15 minutes thorough mixing resin size and aluminium sulfate are added thereto. Paper produced in this way has a brilliant turquoise nuance and exhibits perfect light and wet fastness.

APPLICATION EXAMPLE C

An absorbent length of unsized paper is drawn at 40–50° C. through a dyestuff solution according to Example 1. The excess dyestuff solution is squeezed out through two rollers. The dried length of paper is dyed a brilliant turquoise shade.

The dyestuffs of Examples 2 to 9 may also be used for dyeing by a method analogous to that of Application Examples A to C. The paper dyeings obtained show good fastness properties and the waste water exhibits a low residue dye concentration.

I claim:

1. A liquid dyestuff composition comprising from 4 to 50 wt % of a basic or cationic water soluble dyestuff, an acid, wherein said acid excludes phenolic compounds and 0.1 to 15.0 wt % of a phenolic derivative which can be orcin, gallic acid, gallic acid ester, gallic acid amide; gallic acid N-alkyl amide; gallic acid N,N-dialkyl amide, hydroquinone, pyrogallol, pyrogallol ether, phloroglucin, 3,5-dihydroxybenzoic acid, or 2,4-dihydroxy-benzoic acid, the dyestuff having a solubility in water in the presence or absence of a phenolic derivative of at least 1 g/liter at a temperature of 25° C. and the composition being made up to 100 wt % by water and optionally a water-miscible solvent and/or a dissolving auxiliary.

2. Dyestuff composition as claimed in claim 1, wherein the phenolic derivative has an upper molecular weight of 300.

3. Dyestuff composition as claimed in claim 1, wherein the dyestuff is a cationic or direct basic dyestuff.

4. Dyestuff composition as claimed in claim 1, which further comprises a water-miscible solvent chosen from the group consisting of dimethylformamide, benzylalcohol, glycol, glycolether, formamide, pyrrolidone and N-alkyl pyrrolidone and/or a dissolving auxiliary chosen from the group consisting of urea, dextrine, maltose, lactose, ∈-caprolactam.

5. Dyestuff composition as claimed in claim 1 wherein the acid is chosen from the group consisting of hydrochloric acid, sulfric acid, phosphoric acid, formic acid, acetic acid, glycolic acid, gluconic acid, methanesulfonic acid, citric acid, succinic acid, glutamic acid, adipic acid, lactic acid and mandelic acid.

6. A powder or a granulate formed from an aqueous composition as claimed in claim 1.

7. A process of dyeing a substrate comprising applying a liquid composition as claimed in claim 1 to the substrate, application of the composition being by means of an exhaust- or pad-dyeing process or dyeing in the stock.

8. A process of dyeing a textile substrate comprising applying a dyebath obtained from a powder or a granulate as claimed in claim 7 to the substrate, application of the dyebath being by means of an exhaust- or pad-dyeing process.

9. A process of dying a paper substrate comprising applying a powder or granulate as claimed in claim 7 to the substrate, application of the powder or granulate being by dyeing in the stock.

10. Dyestuff composition as claimed in claim 3 in which the dyestuff is a direct basic dyestuff.

11. Dyestuff composition as claimed in claim 10 in which the direct basic dyestuff is phthalocyanine direct dyestuff.

* * * * *